United States Patent
Lazzarin (10) Patent No.: US 9,550,548 B2
(45) Date of Patent: Jan. 24, 2017

(54) DEVICE FOR MOUNTING A FRONT DERAILLEUR ON A BICYCLE FRAME AND METHOD FOR MOUNTING SUCH A FRONT DERAILLEUR

(71) Applicant: Campagnolo S.r.l., Vicenza (IT)

(72) Inventor: Leopoldo Lazzarin, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 350 days.

(21) Appl. No.: 14/256,631

(22) Filed: Apr. 18, 2014

(65) Prior Publication Data
US 2014/0315671 A1 Oct. 23, 2014

(30) Foreign Application Priority Data
Apr. 19, 2013 (IT) .............................. MI2013A0650

(51) Int. Cl.
*B62M 9/134* (2010.01)
*B62M 9/138* (2010.01)
*B25B 27/00* (2006.01)

(52) U.S. Cl.
CPC .......... *B62M 9/134* (2013.01); *B25B 27/0071* (2013.01); *B62M 9/138* (2013.01)

(58) Field of Classification Search
CPC ..... B25B 27/00; B25B 27/0071; B62M 9/134; B62M 9/1344; B62M 9/135; B62M 9/138

USPC ............................................... 33/645; 474/82
See application file for complete search history.

(56) References Cited

U.S. PATENT DOCUMENTS

| | | | | |
|---|---|---|---|---|
| 5,728,018 A | * | 3/1998 | Terada et al. ........ | B62M 9/1344 474/127 |
| 7,651,424 B2 | * | 1/2010 | Yamamoto et al. ... | B62M 9/135 474/82 |
| 7,867,118 B2 | * | 1/2011 | Yamamoto et al. ... | B62M 9/136 474/80 |
| 2013/0029795 A1 | | 1/2013 | Jordan et al. | |

OTHER PUBLICATIONS

Italian Search Report and Written Opinion in Italian Application No. IT MI2013A000650, Dec. 10, 2013 with English translation.

* cited by examiner

*Primary Examiner* — R. A. Smith
(74) *Attorney, Agent, or Firm* — Volpe and Koenig, P.C.

(57) ABSTRACT

A device for mounting a front derailleur on a bicycle frame is provided. The device comprises engagement means for engaging with at least one toothed crown of a crankset and with the derailleur, the engagement means being configured to obtain a desired relative position between the at least one toothed crown and the derailleur. A method for mounting the front derailleur on the bicycle frame is also provided, such a method providing for the use of the device.

22 Claims, 10 Drawing Sheets

DEVICE FOR MOUNTING A FRONT DERAILLEUR ON A BICYCLE FRAME AND METHOD FOR MOUNTING SUCH A FRONT DERAILLEUR

CROSS REFERENCE TO RELATED APPLICATION

This application claims the benefit of Italian Application No. MI2013A000650, which was filed on Apr. 19, 2013, and is incorporated herein by reference as if fully set forth.

FIELD OF INVENTION

The present invention relates to a device for mounting a front derailleur on a bicycle frame, as well as to a method for mounting the front derailleur on the bicycle frame.

Preferably, the technical field of the present invention is that of racing bicycles.

BACKGROUND

Throughout this description and the following claims, the bicycle derailleur that is referred to is the front derailleur. Such a derailleur is used to move the chain between the different toothed crowns (or toothed wheels) that form the so-called crankset of the bicycle. Typically, in racing bicycles the crankset comprises two or three toothed crowns.

The movement of the chain generally takes place by effect of the movement of a suitable thrusting member, commonly called cage fork or more simply cage. Such a cage is associated with an actuation kinematic mechanism that, deforming upon command by the cyclist, moves the chain from one toothed crown to another. The actuation kinematic mechanism is in turn associated with a derailleur body configured to be fixed to the frame of the bicycle, typically to the so-called seat tube of the frame (i.e. the tube arranged under the saddle).

The most common bicycle derailleurs are manually actuated. Recently, however, motor actuated derailleurs are on the market. In the latter the movement of the cage takes place by means of a motor member that is suitably driven, typically electrically.

The derailleur body is typically mounted on a support element projecting from the seat tube (typically welded thereon). Such a projecting element defines a shaped seat on which a corresponding coupling portion of the derailleur body is fixed in position (typically through a locking screw).

For the derailleur to operate correctly, it is necessary to position it precisely with respect to the crankset. In particular, it is necessary for the derailleur, in a rest configuration (i.e. in a condition in which the actuation kinematic mechanism is in the undeformed state), to have a desired relative position with respect to a reference toothed crown of the crankset that, typically, is the toothed crown with the largest diameter (hereafter: largest toothed crown). More specifically, it is necessary for the cage of the derailleur, in rest configuration, to be located at a desired distance from the largest toothed crown and with the respective middle plane as parallel as possible to the middle plane of the largest toothed crown.

In the prior art, the operator, after having mounted the crankset on the frame of the bicycle, manually positions the derailleur by eyesight with respect to the largest toothed crown of the crankset and fixes the derailleur in position on the projecting element by tightening the locking screw.

The Applicant has found that such mounting operations are particularly demanding, both in terms of time and in terms of the attention that the operator must pay. Moreover, the operator must be adequately trained in the mounting operations, so as to obtain a certain experience and familiarity with the task.

SUMMARY OF THE INVENTION

The Applicant has realised that it is possible to substantially simplify the mounting operations of the derailleur on the frame of the bicycle using a device configured to ensure the immediate and precise positioning of the derailleur with respect to the crankset.

The inventive concept of the present invention must therefore be seen, in its most general terms, precisely in having found a problem of time and operating difficulty in the mounting operations of the prior art and in having solved such a problem by using, in the mounting operations, a suitable auxiliary device.

The present invention therefore, in a first aspect thereof, relates to a device for mounting a front derailleur on a bicycle frame, characterised in that it comprises engagement means for engaging with at least one toothed crown of a crankset and with said derailleur, said engagement means being configured to obtain a desired relative position between said at least one toothed crown and said derailleur.

The use of the aforementioned device allows the operator to immediately identify the optimal position of the derailleur with respect to the crankset, thus bringing a substantial saving of time and a high precision of positioning. Such advantages are particularly significant in original equipment conditions, i.e. when the operator must precisely mount respective derailleurs on a large number of bicycles as quickly as possible.

As a result the aforementioned device is configured like a tool adapted to provide the mounting operations of the derailleur on the frame of the bicycle with an objective repeatability, as well as the aforementioned precision and speed, substantially making such mounting operations not dependent on the skill and experience of the operator.

Preferably, said engagement means define both a desired relative position between said at least one toothed crown and said derailleur along a first direction (which is typically the longitudinal direction of the seat tube of the bicycle), and a desired angular position between said at least one toothed crown and said derailleur (so that the middle plane of the cage of the derailleur is as parallel as possible to the middle plane of the toothed crown).

Preferably, said engagement means comprise first engagement means for engaging with said at least one toothed crown and second engagement means for engaging with said derailleur. More preferably, the aforementioned first engagement means define a desired relative position of said at least one toothed crown with respect to said device. More preferably, the aforementioned second engagement means define a desired relative position of said derailleur with respect to said device. Consequently, the device of the present invention defines the optimal relative position between derailleur and crankset and, therefore, the mounting position of the derailleur on the frame of the bicycle.

Preferably, the crankset comprises at least two toothed crowns and said at least one toothed crown (i.e. the reference toothed crown for positioning the derailleur with respect to the crankset) is the toothed crown with the largest diameter among said at least two toothed crowns. In this way, in the mounting configuration, the derailleur is always in the radially outer position with respect to all of the toothed crowns of the crankset.

Preferably, said engagement means comprise a groove configured to house an annular portion of said at least one toothed crown. Such a groove corresponds to the aforementioned first engagement means.

More preferably, said groove comprises a bottom surface for the abutment of said at least one toothed crown.

The engagement of the device of the invention with the toothed crown is thus extremely quick and easy.

Preferably, said groove has a thickness substantially equal to that of the annular portion of said at least one toothed crown housed in said groove. This prevents the toothed crown from being able to move inside the groove, to the detriment of the precision of positioning of the device and, therefore, of the derailleur with respect to the toothed crown.

Preferably, said groove extends with a curvature substantially equal to that of said at least one toothed crown. This contributes to the stable positioning of the toothed crown inside the groove and, therefore, to the correct mutual positioning between toothed crown and derailleur.

Preferably, said groove is defined on a radially inner face of said device.

In the present description and in the subsequent claims, the expressions "radially inner" and "radially outer" of the faces of the device are used referring to a condition in which the device is mounted on a toothed crown and, therefore, to faces of the device that, along a direction substantially parallel to the longitudinal direction of a radius of the portion of the aforementioned toothed crown on which the device is mounted, are located respectively closer to and farther from the centre of the toothed crown.

Preferably, said front derailleur comprises a derailleur body configured to be associated with said frame and a cage associated with said derailleur body and configured to move a chain between said at least one toothed crown and another toothed crown of said crankset, wherein said engagement means comprise an abutment surface of said cage. The engagement between device of the invention and derailleur is thus a simple abutment or resting engagement.

More preferably, said abutment surface is defined on a radially outer face of said device.

In a preferred embodiment of the device of the present invention therefore at least one portion of the device is thus substantially arranged between the toothed crown, housed in the groove formed on the radially inner face of the device, and the cage, in abutment on the radially outer face of the device. Such a portion of device thus defines the optimal distance between cage and toothed crown along a direction substantially parallel to the longitudinal direction of the seat tube of the bicycle.

In the preferred embodiment of the device of the invention, said cage comprises an axially inner arm and an axially outer arm and said abutment surface has a curvature substantially equal to that of a portion of radially inner surface of said axially outer arm.

In this way, it is ensured that the cage rests in an optimal manner on the abutment surface of the device of the invention.

In the present description and in the subsequent claims, the expressions "axially inner" and "axially outer" are used referring to respective positions along a direction substantially parallel to the axis of the crankset mounted on the frame, by inner indicating the part facing towards the frame of the bicycle and by outer indicating the part facing towards the right crank arm of the bicycle.

Preferably, said groove and said abutment surface are integral parts of a single body having a predetermined thickness between said bottom surface and said abutment surface, said thickness defining a predetermined relative position between said at least one toothed crown and said cage along a first direction that, as already stated, substantially corresponds to the longitudinal direction of the seat tube of the bicycle.

In this way, the device is extremely compact and practical to use. Advantageously such a thickness is selected equal to the optimal distance between cage and toothed crown along a direction substantially parallel to the longitudinal direction of the seat tube of the bicycle.

Preferably, the aforementioned body is made from plastic material, so as to be extremely light, easy to make through moulding operations and, therefore, cost-effective.

Preferably, the device of the invention comprises a visual reference configured to define said desired angular position between said at least one toothed crown and said cage.

More preferably, said visual reference is defined by a line drawn on said abutment surface.

As an alternative to the provision of a visual reference, the device of the invention can comprise a shoulder configured to define said desired angular position between said at least one toothed crown and said cage.

More preferably, said shoulder is configured to go into abutment with an axially outer surface of said axially outer arm.

Advantageously, the provision of a visual reference or of a shoulder ensures the desired angular positioning of the derailleur with respect to the crankset to be achieved in a substantially immediate manner.

In preferred embodiments of the device of the invention, it comprises a maneuvering appendage, preferably projecting axially, which allows quick mounting and dismounting of the device onto and from the toothed crown.

In a second aspect thereof, the present invention relates to a method for mounting a front derailleur onto a bicycle frame, characterised in that it comprises the steps of:
  engaging a mounting device with a toothed crown of a crankset mounted on said frame;
  bringing said derailleur in engagement with said device, so as to obtain a desired relative position between said derailleur and said toothed crown;
  fixing said derailleur onto said frame;
  removing said device from said toothed crown.

The device used in the aforementioned method preferably has, individually or in combination, all of the structural and functional characteristics discussed above. Therefore, the method of the invention has all of the aforementioned advantages.

Preferably, the step of bringing said derailleur into engagement with said device comprises the steps of:
  bringing said derailleur into abutment on said device;
  rotating, if necessary, said derailleur with respect to said device until said derailleur is aligned with a visual reference associated with said device or until said derailleur is brought into abutment against a shoulder of said device.

More preferably, the step of removing said device from said toothed crown comprises moving said device on said toothed crown until a position is reached in which said device can be disengaged from said toothed crown without interfering with said derailleur.

BRIEF DESCRIPTION OF THE DRAWINGS

Further characteristics and advantages of the present invention will become clearer from the following detailed description of preferred embodiments thereof, made with reference to the attached drawings and provided just for indicating and not limiting purposes.

In the drawings.

DETAILED DESCRIPTION OF THE PREFERRED EMBODIMENTS

Figure 7:
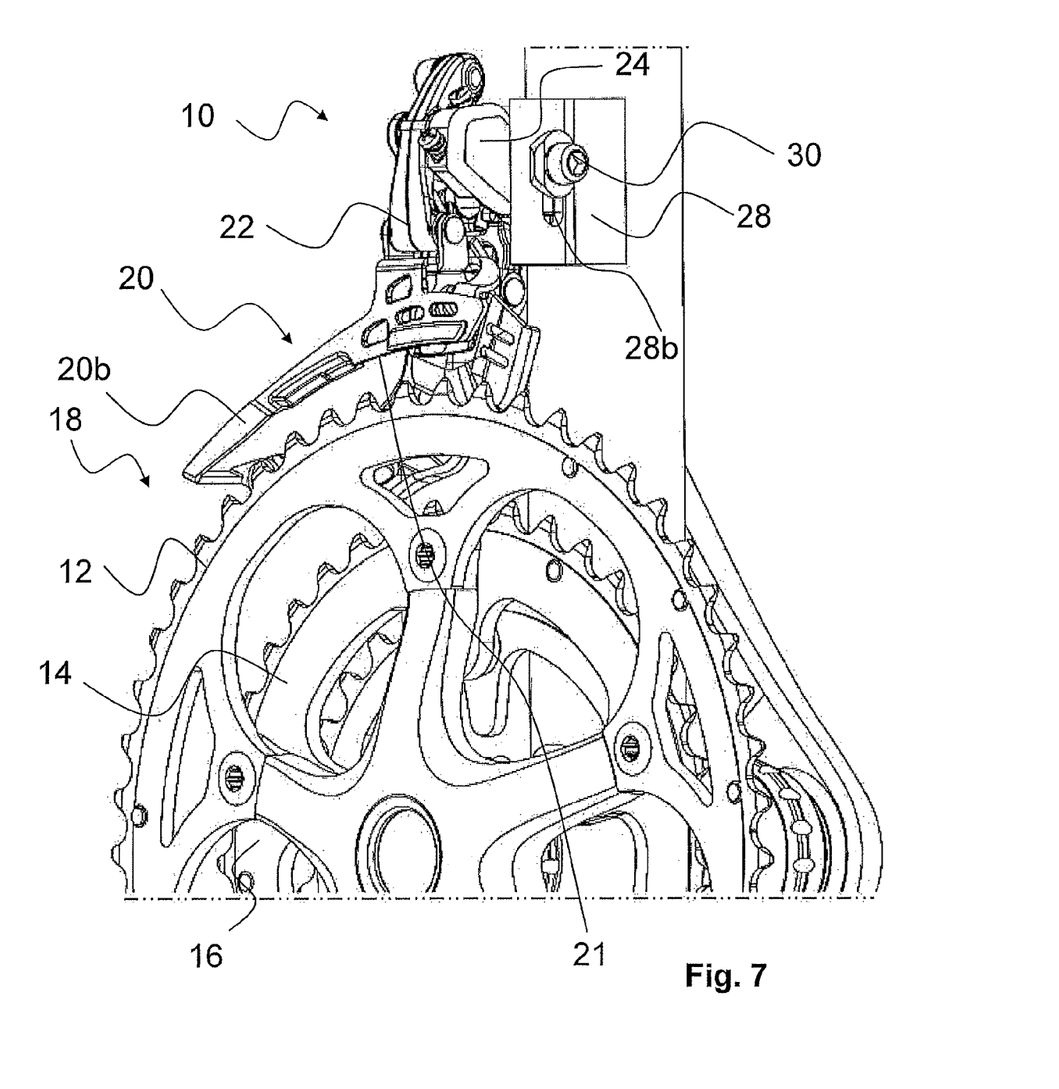
FIG. 7 is a schematic perspective view representative of a final step of the mounting of the derailleur on the seat tube, after the removal of the device of FIG. 3.

With initial reference to FIG. 7, a front derailleur of a bicycle and a crankset of a bicycle are shown. The derailleur is wholly indicated with 10, whereas the crankset is indicated with 18.

The derailleur 10, as known, is used to move the chain (not illustrated) between the toothed crowns of the crankset 18. In the non-limiting example of FIG. 7 the crankset 18 comprises three toothed crowns 12, 14, 16, the toothed crown 12 being the one with the largest diameter and being arranged in an axially outer position with respect to the crowns 14 and 16.

The movement of the chain takes place through the effect of the movement of a cage 20 of the derailleur 10. Such a cage 20 is associated with an actuation kinematic mechanism 22 and comprises an axially inner arm 20a and an axially outer arm 20b, as shown in FIG. 2.

Figure 1:
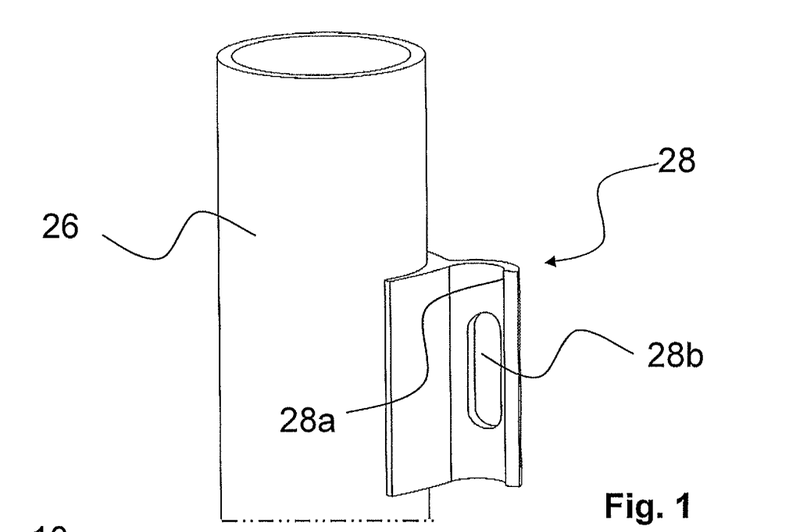
FIG. 1 is a schematic perspective view of a portion of a seat tube of a bicycle frame, provided with a projecting support element for fixing a front derailleur, such a support element being welded to the seat tube.
Figure 2:
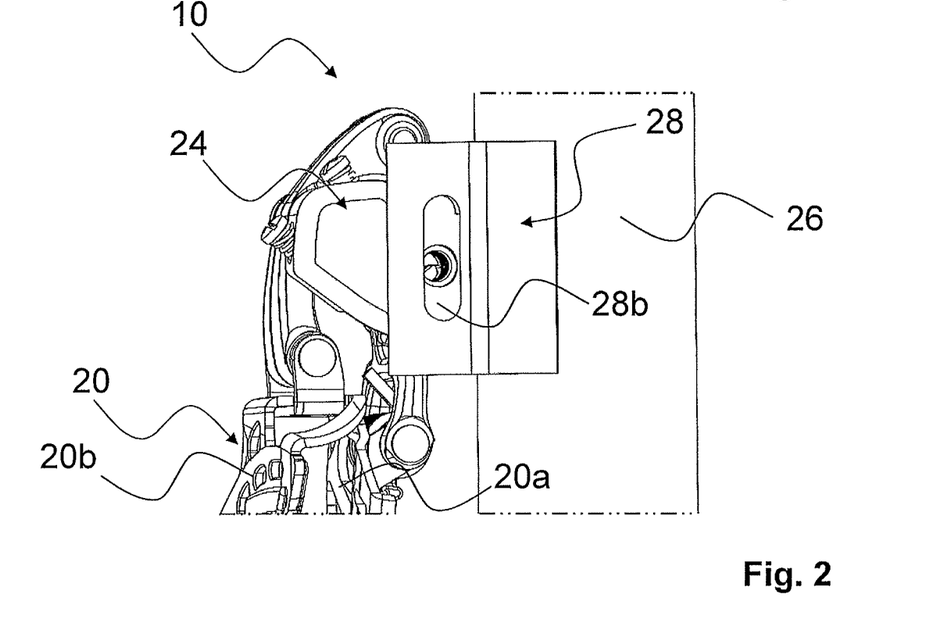
FIG. 2 is a schematic perspective view of the portion of seat tube of FIG. 1, seen from an opposite side with respect to FIG. 1, with a front derailleur (only partially shown) in an intermediate step of the mounting of the latter on the seat tube.
Figure 10:
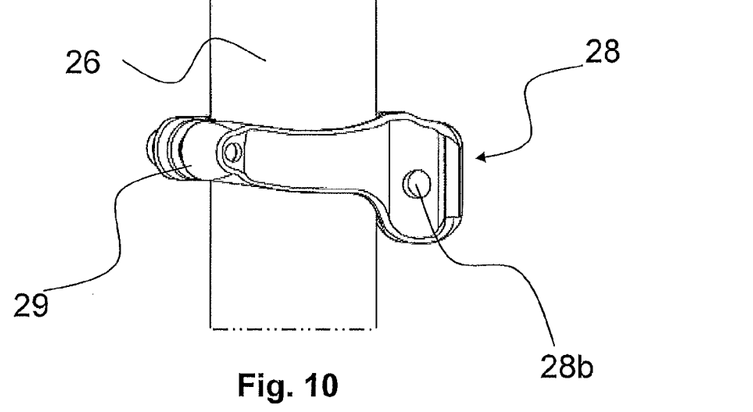
FIG. 10 is a schematic perspective view of a portion of a seat tube of a bicycle frame on which a clip is mounted defining a projecting support element for fixing a front derailleur.
Figure 11:
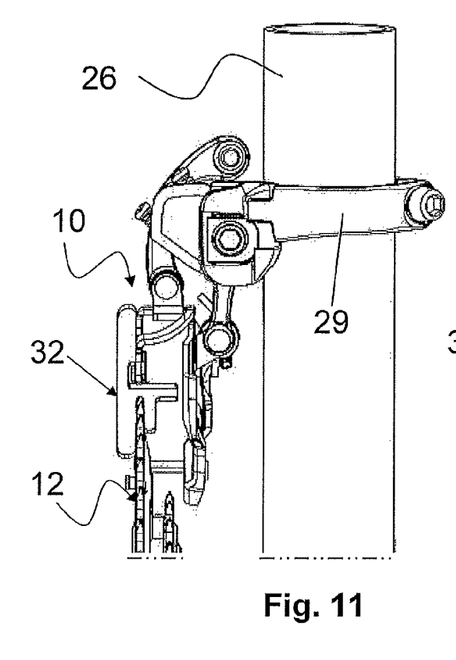
FIG. 11 is a schematic perspective view representative of a final step of the mounting of the derailleur on the seat tube of FIG. 10 through the device of FIGS. 8 and 9.
Figure 12:
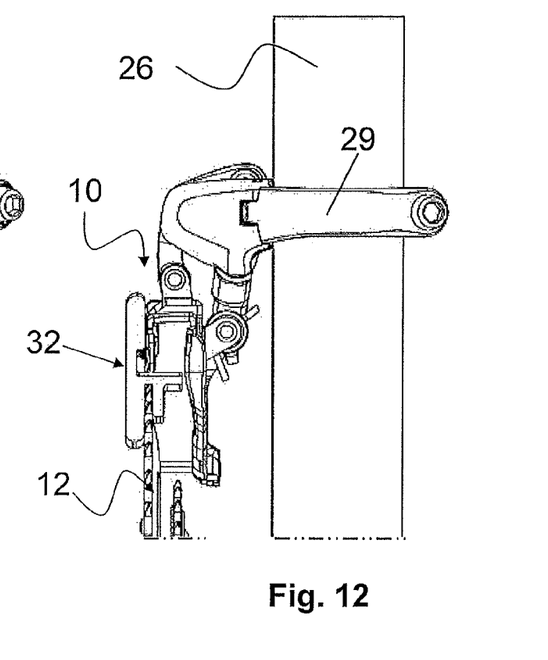
FIG. 12 is a schematic side view representative of a final step of the mounting, through the device of FIGS. 8 and 9, of a front derailleur on a seat tube of a bicycle, such a derailleur comprising a clip for fixing in position on the seat tube, such a clip being made in a single piece with a derailleur body.
Figure 13:
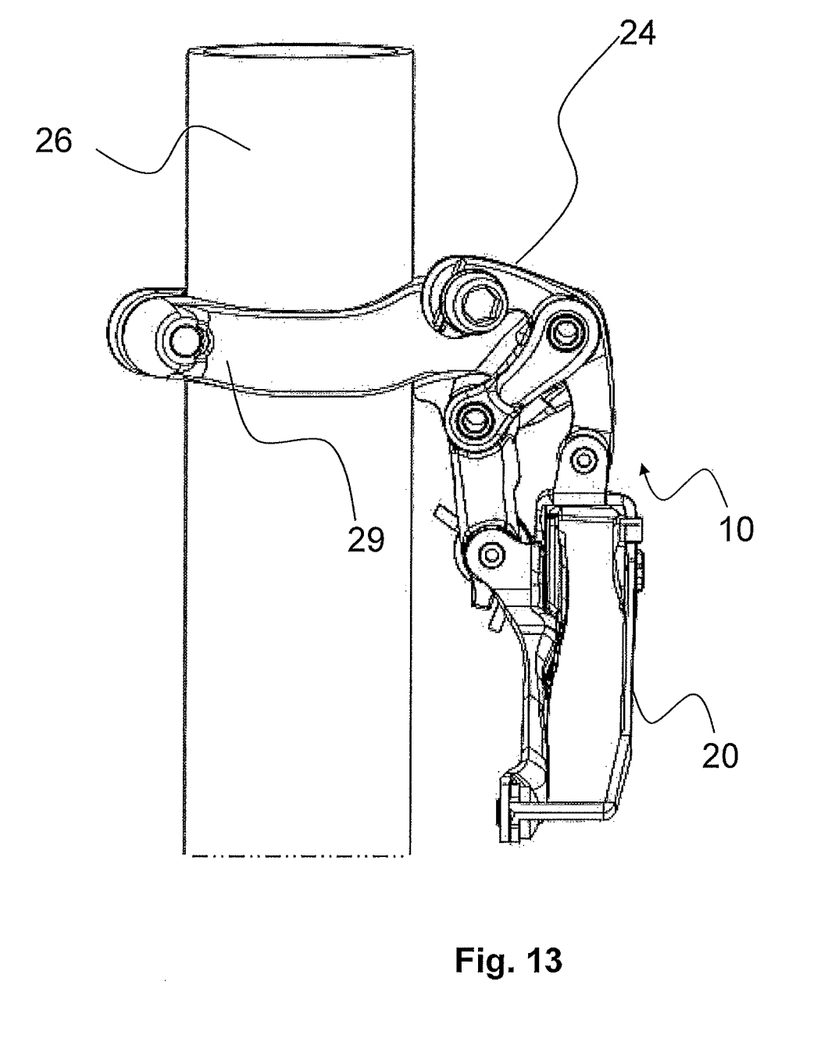
FIG. 13 is a schematic perspective view of the derailleur of FIG. 12 in the same mounting step illustrated in FIG. 12.

The actuation kinematic mechanism 22 is associated with a derailleur body 24 that is fixed onto a support element 28 projecting from a seat tube 26 of a bicycle frame, as shown in FIGS. 1 and 2. Typically, the support element 28 is welded on the seat tube 26 but, as described below, it can be defined by a clip configured to be fixed, through a corresponding locking screw, on the seat tube 26 (FIGS. 10 and 11). Alternatively, the support element 28 can be defined by a clip 29 made in one piece with the derailleur body 24 (FIGS. 12 and 13).

With reference to FIGS. 1-2 and 4-9, on the support element 28 a shaped seat 28a is defined for the coupling of a corresponding coupling portion of the derailleur body 24. The fixing in position of the aforementioned coupling portion on the aforementioned shaped seat 28a (and therefore the fixing in position of the derailleur 10 on the support element 28) takes place through a locking screw 30 (or analogous locking means).

The support element 28 is per sè conventional and comprises a through opening 28b through which the locking screw 30 passes. A corresponding through opening is formed on the coupling portion of the derailleur body 24 for the locking screw 30 to pass through.

The through opening 28b is wider than the bulk in section of the locking screw 30, so as to make it possible to adjust both the relative position of the derailleur 10 with respect to the crankset 18 along a direction parallel to the longitudinal direction of the seat tube 26, and the angular position of the derailleur 10 with respect to the crankset 18.

With reference to FIGS. 10 and 11, the support element 28 is defined by a clip 29 that comprises a substantially circular through opening 28b having a diameter that substantially corresponds to that of the locking screw 30. In this case, the relative position of the derailleur 10 with respect to the crankset 18 along a direction parallel to the longitudinal direction of the seat tube 26 and the angular position of the derailleur 10 with respect to the crankset 18 are permitted by moving the clip 29 along the seat tube 26 and rotating the clip 29 with respect to the seat tube 26.

Alternatively, as shown in FIGS. 12 and 13, the clip 29 is made in one piece with the derailleur body 24.

Irrespective of the specific embodiment of the support element 28, the derailleur 10 must be fixed in position on the seat tube 26 so that, in a rest configuration, the derailleur 10 has a desired relative position with respect to a reference toothed crown of the crankset 18, which in the non-limiting example herein illustrated is the toothed crown 12.

Hereafter we will refer explicitly to the case in which the derailleur 10 is configured to be associated with a support element 28 welded onto the seat tube 26 of a bicycle (FIGS. 1-2 and 4-9). What is stated nevertheless has analogous application in the case in which the derailleur 10 is configured to be associated with a clip 29 (FIGS. 10 and 11) or in the case in which the derailleur body 24 has a clip 29 made in one piece, with the sole modification that the fixing of the derailleur 10 in the desired position on the seat tube 26 takes place through the effect of the fixing of the clip 29 on the seat tube 26 through the respective locking screw.

With reference to FIGS. 3-6, a first embodiment of a device 32 is shown that allows easy and precise mounting of the front derailleur 10 on the seat tube 26, in accordance with the present invention.

The device 32 comprises a body 32a, preferably made from plastic material, preferably having an arched shape along its longitudinal direction, with a curvature substantially equal to that of the toothed crown 12 of the crankset 18.

The body 32a comprises first engagement means 34a with the toothed crown 12 and second engagement means 34b with the derailleur 10.

The first engagement means 34a define a desired relative position of the toothed crown 12 with respect to the device 32, whereas the second engagement means 34b define a desired relative position of the derailleur 10 with respect to the device 32.

Consequently, the engagement means 34a, 34b make it possible to obtain a desired relative position between the toothed crown 12 and the derailleur 10. Such a desired relative position is substantially that in which the derailleur 10 is at a desired height with respect to the toothed crown 12 along the longitudinal direction of the seat tube 26 and a middle plane of the cage 20 of the derailleur 10 is substantially parallel to the middle plane of the toothed crown 12.

Figure 3:
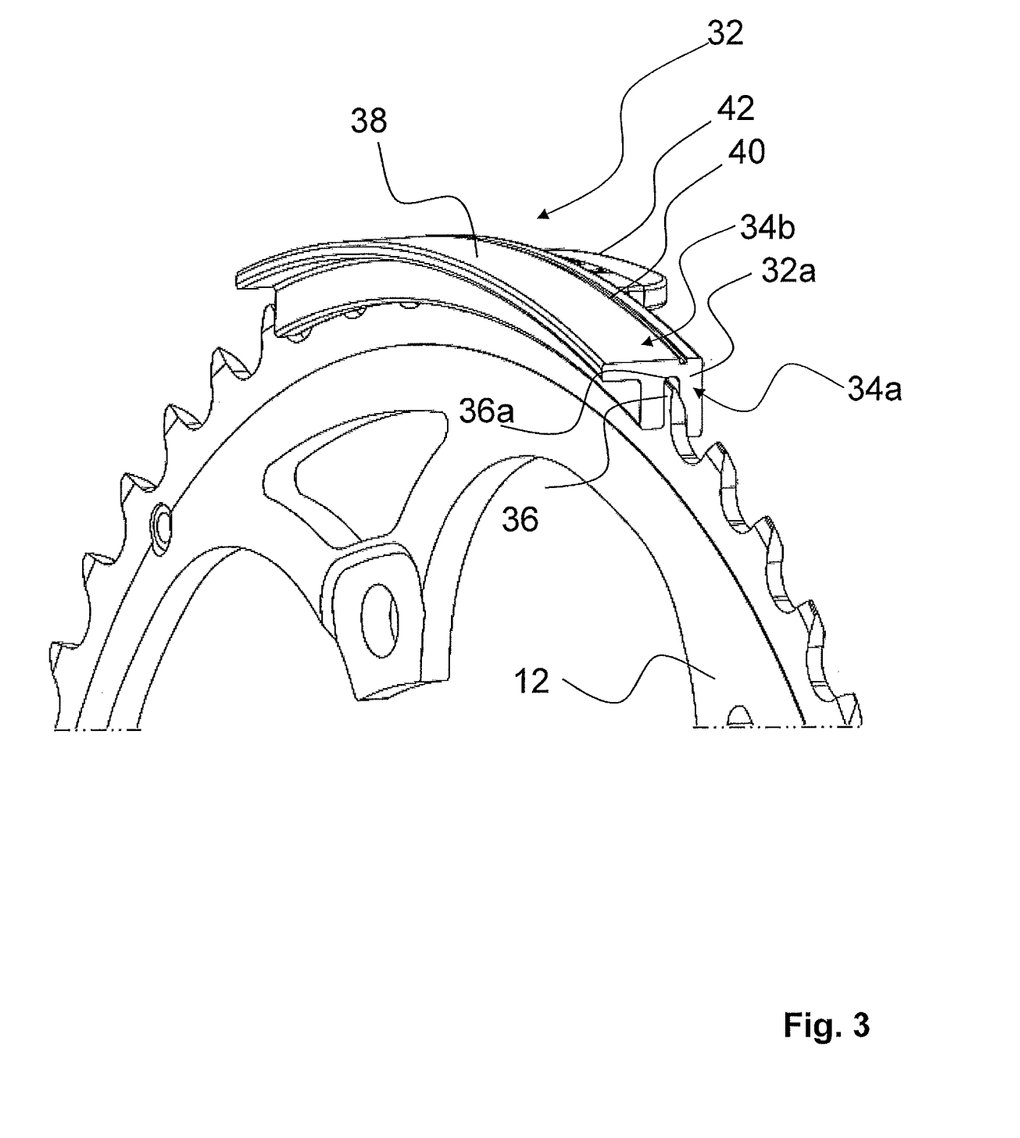
FIG. 3 is a schematic perspective view of a first embodiment of a device according to the present invention engaged on a toothed crown of a crankset of said bicycle.
Figure 4:
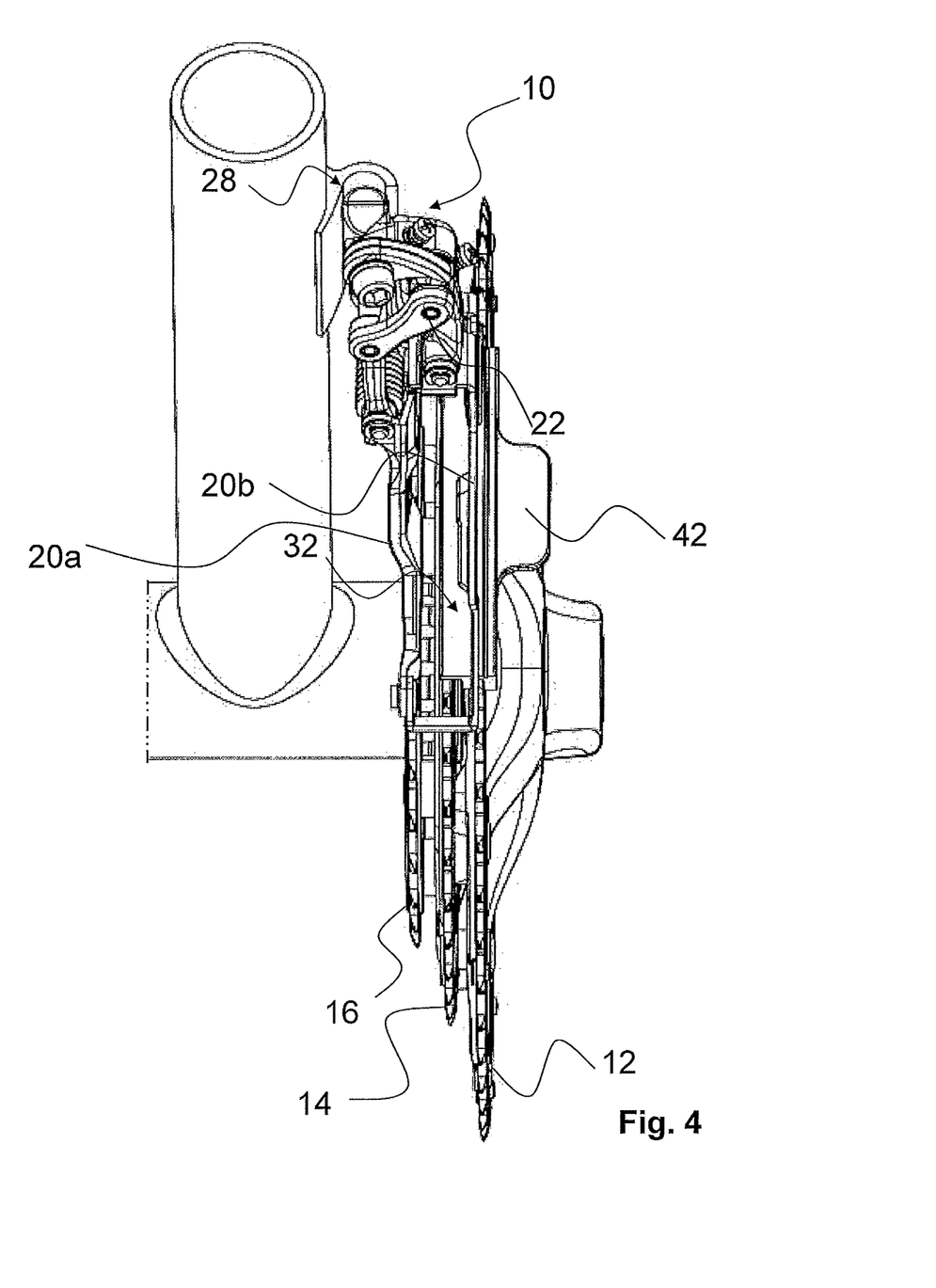
FIGS. 4 to 6 are schematic perspective views—taken from different points of view—representative of a final step of the mounting of the derailleur on the seat tube through the device of FIG. 3.
Figure 5:
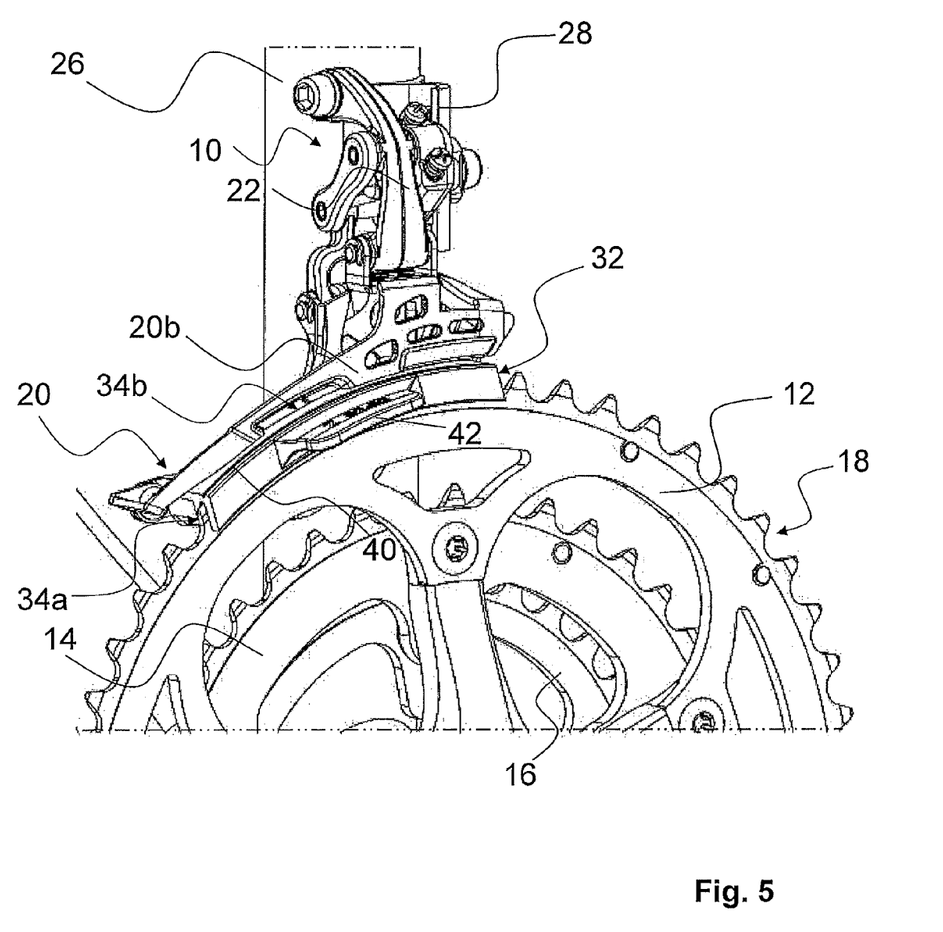
Figure 6:
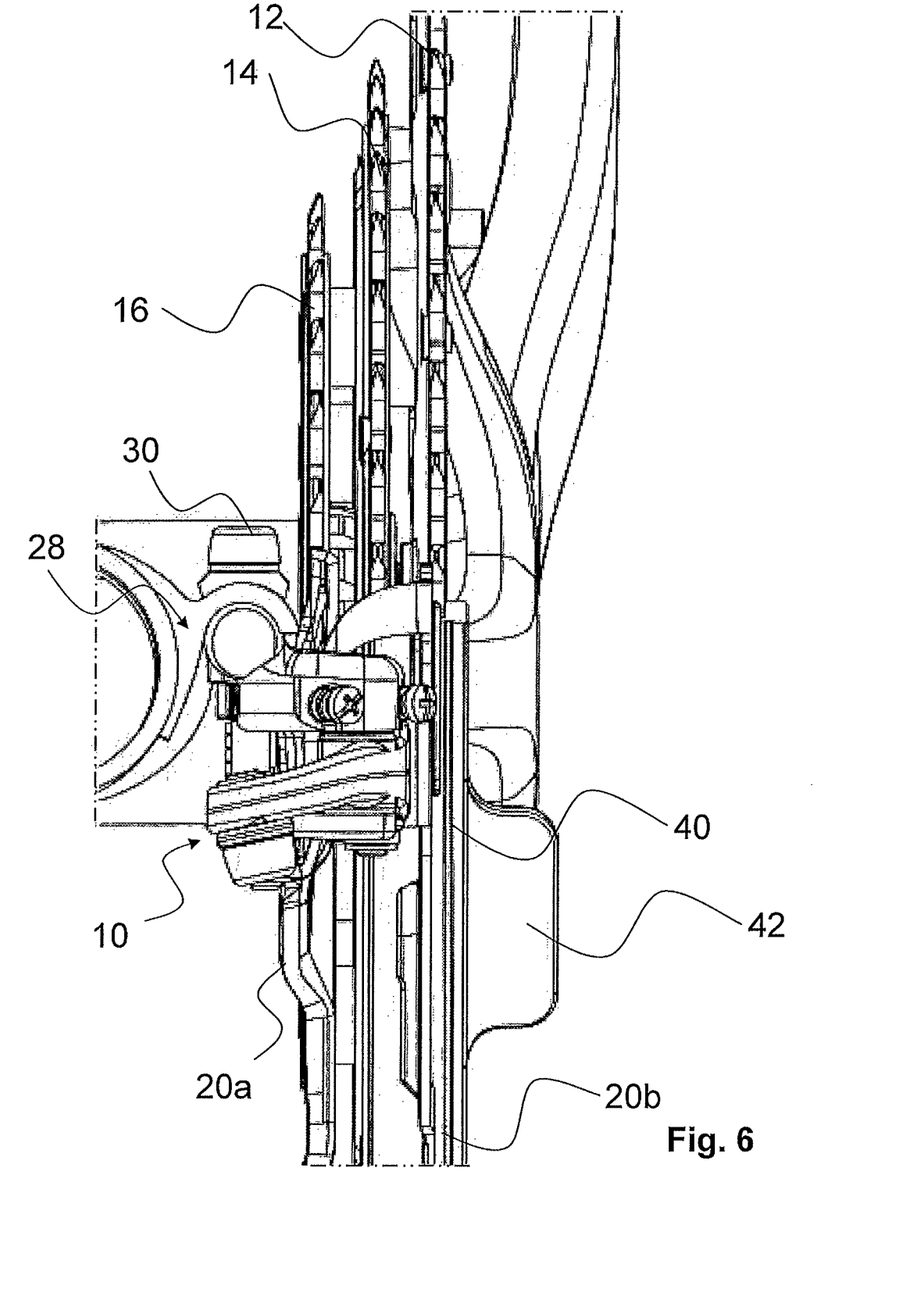

In the example herein illustrated, the first engagement means 34a comprise a groove 36 configured to house an annular portion of the toothed crown 12. The groove 36 is defined on a radially inner face of the body 32a, as shown in FIG. 3.

The groove 36 comprises a bottom surface 36a that is brought into abutment on the toothed crown 12 and has a thickness substantially equal to that of the annular portion of the toothed crown 12 housed therein.

The second engagement means 34b comprise an abutment surface 38 for the cage 20. The abutment surface 38 is defined on a radially outer face of the body 32a, as shown in FIG. 3.

The groove 36 and the abutment surface 38 have a longitudinal extension equal to that of the body 32a and a curvature substantially equal to that of the body 32a (i.e. substantially equal to that of the toothed crown 12). Such a curvature is also substantially equal to that of a radially inner surface portion 21 of the axially outer arm 20b of the cage 20.

The body 32a has a predetermined thickness between the bottom surface 36a and the abutment surface 38, which defines the desired relative position between cage 20 and toothed crown 12 along the longitudinal direction of the seat tube 26 of the bicycle. Such a relative position corresponds to the optimal position at which the derailleur 10 has to be fixed on the support element 28.

The device 32 also comprises a visual reference configured to define the desired angular position between the toothed crown 12 and the cage 20. In the non-limiting example herein illustrated, the visual reference is defined by a line 40 drawn on the abutment surface 38 of the body 32a of the device 32. Such a line, preferably, is of a different colour from that of the body 32a, for example white.

The body 32a also has a manoeuvring appendage 42, which in the specific embodiment herein illustrated is defined by a tongue that projects axially with respect to the abutment surface 38.

Figure 8:
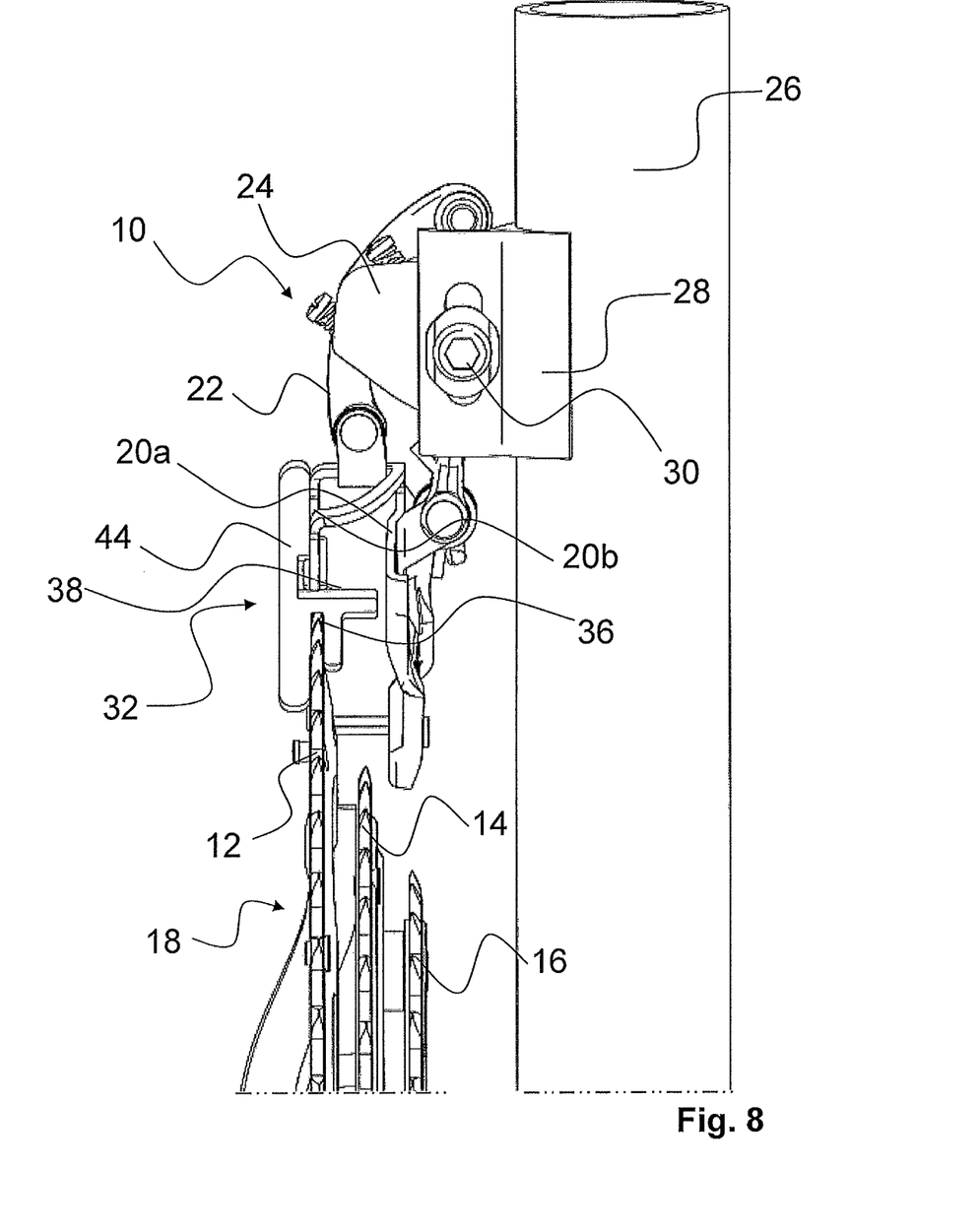
FIGS. 8 and 9 are schematic views—taken from different points of View—representative of a final step of the mounting of the derailleur on the seat tube through an alternative embodiment of the device of the present invention.
Figure 9:
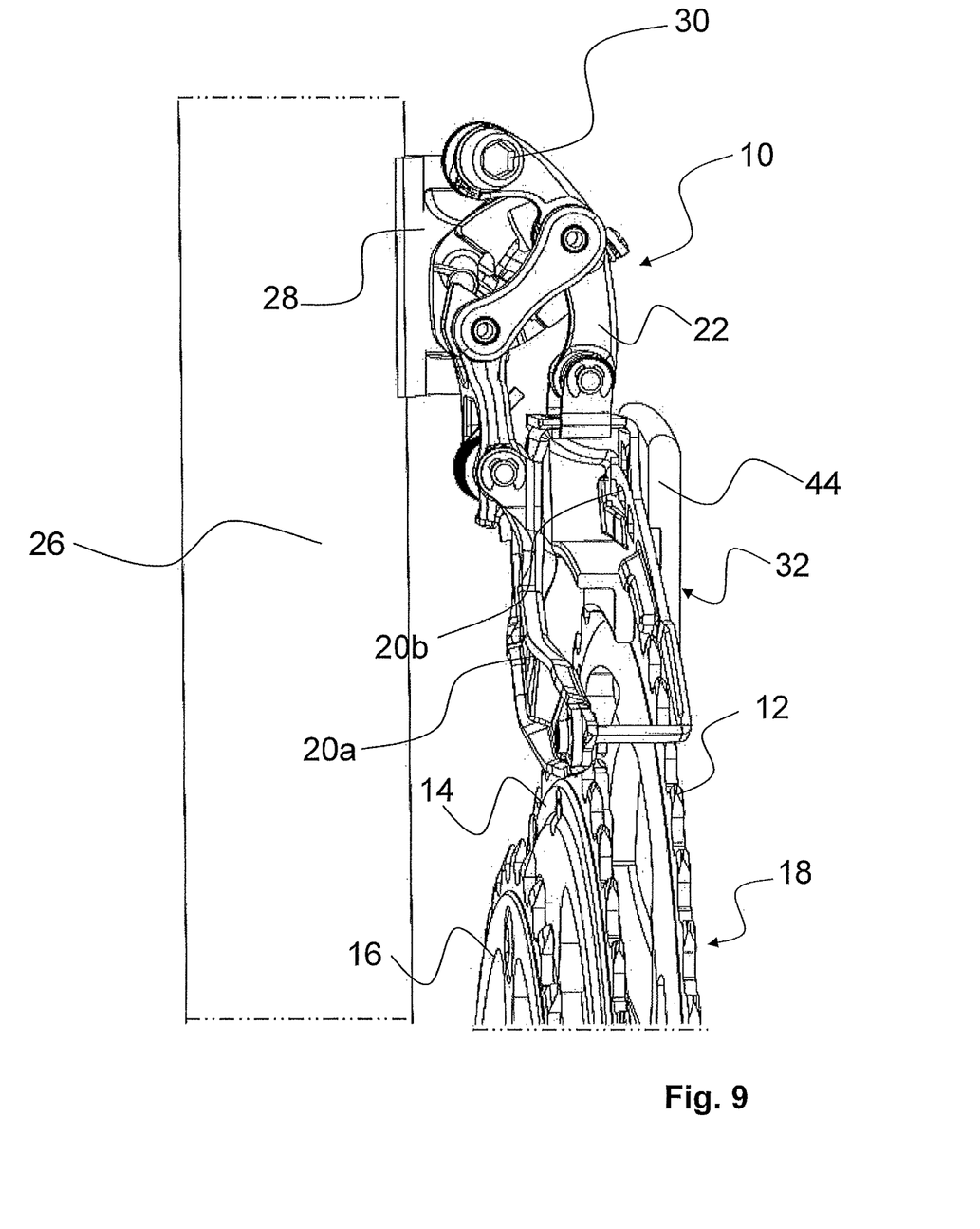

FIGS. 8 and 9 show a second embodiment of a device 32 in accordance with the present invention.

In FIGS. 8 and 9, structural elements that are identical or equivalent in functional terms to those of the device 32 described above with reference to FIGS. 3-7 will be given the same reference numerals and they will not be described any further.

In particular, the device 32 of FIGS. 8 and 9 comprises, instead of the visual reference defined by the line 40, a shoulder 44.

The shoulder 44 is configured to go into abutment with an axially outer surface of the axially outer arm 20b of the cage 20, thus obtaining the desired angular position between the toothed crown 12 and the cage 20.

The mounting of the derailleur 10 on the support element 28 of the seat tube 26 of the bicycle can be clearly seen from what has been discussed above and it is discussed below in the specific operating steps thereof.

The operator fits the device 32 onto the toothed crown 12 of the crankset 18, which has been mounted beforehand on the frame of the bicycle, by arranging an annular portion of the toothed crown 12 in the groove 36 of the device 32 (FIG. 3) and bringing the bottom surface 36a of the groove 36 in abutment on the toothed crown 12.

The operator then brings the axially outer arm 20b of the cage 20 of the derailleur 10 in abutment on the abutment surface 38 of the body 32a of the device 32, thus obtaining the desired relative position between the derailleur 10 and the toothed crown 12 along the longitudinal direction of the seat tube 26.

At this point, without lifting the derailleur 10 from the device 32, the derailleur 10 is rotated, if necessary, with respect to the device 32 until the axially outer arm 20b of the cage 20 is aligned with the line 40 drawn on the abutment surface 38 (FIGS. 4-6) or until the axially outer arm 20b of the cage 20 is brought into abutment against the shoulder 44 (FIGS. 8 and 9), thus obtaining the desired angular position of the derailleur 10 with respect to the crankset 18.

The operator then takes care of fixing the derailleur 10 on the support element 28, tightening the locking screw 30 (FIG. 2).

The device 32 is then moved circumferentially on the toothed crown 12 by acting on the manoeuvring appendage 42, until a position is reached in which the device 32 can be disengaged from the toothed crown 12 without interfering with the derailleur 10.

In the embodiment of FIGS. 10 and 11, the operator mounts the derailleur on the clip 29 and adjusts the position of the derailleur 10 with respect to the crankset 18 in an identical manner to what has been described above. After this, the operator fixes the clip 29 in position on the seat tube 26 through the respective locking screw.

In the embodiment of FIGS. 12 and 13, since the clip 29 is made in one piece with the derailleur body 24, the worker just adjusts the position of the derailleur 10 with respect to the crankset 18 in an identical manner to what has been described above with reference to FIGS. 1-9 and then fixes the clip 29 in position on the seat tube 26 through the respective locking screw, just as described above with reference to FIGS. 10 and 11.

Of course, in order to satisfy specific and contingent requirements, a man skilled in the art can bring numerous modifications and variants to the device described above, all of which are in any case within the scope of protection of the present invention as defined by the following claims.

For example, the device of the invention can comprise, instead of a visual reference or a shoulder configured to define the desired angular position of the crankset and the cage, a radially outer groove configured to house a portion of the cage.

What is claimed is:

1. A removable device for mounting a front derailleur on a bicycle frame, comprising engagement means for engaging with at least one toothed crown of a crankset and with said derailleur, said engagement means being configured to be located between said at least one toothed crown and said derailleur to obtain a desired relative position between said at least one toothed crown and said derailleur.

2. The removable device according to claim 1, wherein said engagement means define a desired relative position between said at least one toothed crown and said derailleur along a first direction and a desired angular position between said at least one toothed crown and said derailleur.

3. The removable device according to claim 2, comprising a visual reference configured to define said desired angular position between said at least one toothed crown and a cage of said front derailleur.

4. The removable device according to claim 3, wherein said front derailleur comprises a derailleur body configured to be associated with said frame and said cage is associated with said derailleur body and configured to move a chain between said at least one toothed crown and another toothed crown of said crankset, wherein said engagement means comprise an abutment surface for said cage, wherein said visual reference is defined by a line drawn on said abutment surface.

5. The removable device according to claim 2, comprising a shoulder configured to define said desired angular position between said at least one toothed crown and a cage of said front derailleur.

6. The removable device according to claim 5, wherein said cage comprises an axially inner arm and an axially outer arm, said engagement means comprise an abutment surface for said cage and wherein said abutment surface has a curvature substantially equal to that of a portion of a radially inner surface of said axially outer arm, wherein said shoulder is configured to go into abutment with an axially outer surface of said axially outer arm.

7. The removable device according to claim 1, wherein said engagement means comprise first engagement means for engaging with said at least one toothed crown and second engagement means for engaging with said derailleur, wherein said first engagement means define a desired relative position of said at least one toothed crown with respect to said device and wherein said second engagement means define a desired relative position of said derailleur with respect to said device.

8. The removable device according to claim 1, wherein said crankset comprises at least two toothed crowns and said at least one toothed crown is the toothed crown with the greater diameter of said at least two toothed crowns.

9. The removable device according to claim 1, wherein said engagement means comprise a groove configured to house an annular portion of said at least one toothed crown.

10. The removable device according to claim 9, wherein said groove comprises a bottom surface for the abutment of said at least one toothed crown.

11. The removable device according to claim 9, wherein said groove has a thickness substantially equal to that of the annular portion of said at least one toothed crown housed in said groove.

12. The removable device according to claim 9, wherein said groove extends with a curvature substantially equal to that of said at least one toothed crown.

13. The removable device according to claim 9, wherein said groove is defined on a radially inner face of said device.

14. The removable device according to claim 1, wherein said front derailleur comprises a derailleur body configured to be associated with said frame and a cage associated with said derailleur body and configured to move a chain between said at least one toothed crown and another toothed crown of said crankset, wherein said engagement means comprise an abutment surface for said cage.

15. The removable device according to claim 14, wherein said abutment surface is defined on a radially outer face of said device.

16. The removable device according to claim 14, wherein said cage comprises an axially inner arm and an axially outer arm and wherein said abutment surface has a curvature substantially equal to that of a portion of a radially inner surface of said axially outer arm.

17. The removable device according to claim 14, wherein said engagement means comprise a groove that comprises a bottom surface for the abutment of said at least one toothed crown, wherein said groove and said abutment surface are integral parts of a single body having a predetermined thickness between said bottom surface and said abutment surface, said thickness defining a predetermined relative position between said at least one toothed crown and said cage along a first direction.

18. The removable device according to claim 1, comprising a manoeuvring appendage, projecting axially.

19. Method for mounting a front derailleur on a bicycle frame, comprising the steps of:
engaging a mounting device with a toothed crown of a crankset mounted on said frame;
bringing said derailleur in engagement with said device, so as to obtain a desired relative position between said derailleur and said toothed crown;
fixing said derailleur onto said frame;
removing said device from said toothed crown.

20. Method according to claim 19, wherein said step of bringing said derailleur into engagement with said device comprises the steps of:
bringing said derailleur into abutment on said device;
if necessary, rotating said derailleur with respect to said device until said derailleur is aligned with a visual reference associated with said device or until said derailleur is brought into abutment against a shoulder of said device.

21. Method according to claim 19, wherein said step of removing said device from said toothed crown comprises moving said device on said toothed crown until a position is reached in which said device can be disengaged from said toothed crown without interfering with said derailleur.

22. Device for insertion between a front derailleur and at least one toothed crown of a crankset sprocket to set a desired spacing between them, the device comprising:
a body having:
a groove that receives an annular portion of at least one toothed crown of a sprocket and is shaped to complement the annular portion of the sprocket; and
a thickness extending above the groove that is selected to define a desired spacing between a front derailleur and the at least one toothed crown.

* * * * *